Patented Mar. 22, 1949

2,465,292

UNITED STATES PATENT OFFICE 2,465,292

CHEMICAL PROCESS

William J. Sparks, Westfield, and David W. Young, Roselle, N. J., assignors to Standard Oil Development Company, a corporation of Delaware No Drawing. Application October 19, 1945, Serial No. 623,461

9 Claims. (Cl. 252—46.6)

This invention relates to olefinic polymers. It relates particularly to processes for the treatment of olefinic polymers, and relates especially to the treatment of polymers of cyclodienes with phosphorus pentasulfide.

It has been found possible to treat various polymers and other high molecular weight substances by phosphorus pentasulfide and analogous compounds to add to the polymer molecule substantial portions of phosphorus and sulfur which are of particular value in modifying the characteristics of the polymer and are of especial value when the polymer is dissolved in oil solution for the making of thickened lubricants for use under extreme pressure conditions. In this solution the polymer molecule as such effects the desired thickening; and the presence of sulfur and phosphorus imparts extreme pressure properties to the resulting lubricant. However, both the thickening properties and the improvement in the viscosity index are factors of the molecular weight of the particular polymer dissolved in the lubricating oil. The addition of phosphorus and sulfur, or other extreme pressure agents, is a matter of considerable difficulty, and in any reaction sufficiently powerful to put into the polymer a substantial amount of any of these substances, there is a strong tendency toward molecular weight breakdown. This tendency is particularly strong in a reaction for the addition of such substances as phosphorus pentasulfide, since the reaction tends to break the polymer chain at the point of reaction with the phosphorus pentasulfide; in consequence, when any substantial amount of phosphorus pentasulfide has been combined into a polymer, the molecular weight breakdown usually is sufficiently extensive to impair the utility of the resulting compound as a thickening agent. Hence a compromise must be effected between the necessary molecular weight and the desirable amount of intercombined phosphorus and sulfur with the result that the resulting thickening action and improvement is less than should be obtainable.

It is now found that polymers of cyclopentadiene as such, and its various substituted forms, are not subject to molecular weight breakdown of the type which is characteristic of the ordinary polymers, such as polyisobutylene, or the high molecular weight hydrocarbons and the like. The indications suggest that when the various cyclopentadienes are polymerized, the diene ring is not broken, but remains intact, with the polymerization forming a linear chain polymer containing side rings—one of the double linkages in each ring molecule being reduced to a single linkage, the second linkage being satisfied by a bond with the second linkage in an adjacent ring. The resulting polymer is a linear chain compound containing no unsaturation in the chain, with each pair of carbon atoms in the chain forming part of a five carbon atom ring containing one double linkage (and any substituents which may have been present in the original polymer molecule). It is further found that because of this multi-ring structure treatment with phosphorus pentasulfide does not break the main chain but may break particular rings, which however does not interfere with the continuity of the basic linear chain of the polymer.

It is not as yet known whether a carbon cyclic ring is broken for each molecule of phosphorus pentasulfide combined into the polymer structure, but it is known that no chain breakage occurs when the molecule of phosphorus pentasulfide combines into the structure. It does, however, affirmatively appear that most of the cyclic rings in the polymer will accept a molecule of phosphorus pentasulfide with the result that a very much larger amount of phosphorus and sulfur can be combined into the polymer molecule than is possible with any other substance, without degradation of the polymer chain, and accordingly a relatively very large percentage of phosphorus and sulfur can be combined into the polymer while retaining its original chain length (and increased molecular weight). Accordingly, a compound of high thickening power because of its large molecular size is obtained, which because of its chain length and high molecular weight imparts to an oil in which it is dissolved a very satisfactory body and also a very satisfactory viscosity index, and at the same time makes it possible to incorporate into a lubricant an amount of combined sulfur and phosphorus yielding extreme pressure properties which are unobtainable in any other way.

Thus the invention provides a polymer of relatively very high molecular weight, which is oil soluble, of excellent bodying power in oil solution; which yields a very greatly improved viscosity index, and at the same time brings into the lubricant an amount of combined phosphorus and combined sulfur which cannot be incorporated in a high viscosity index oil by any other means. Thus the present polymer is unique because of its previously unobtainable combination of capabilities of giving excellent thickening power, greatly improved viscosity index, and at the same time extreme pressure properties which are superior to any other prior product because of the relatively very high amount of combined phosphorus and sulfur. It may be noted that the amount of combined sulfur and phosphorus in the polymer is readily adjusted to any amount within the range between .05 per cent and 15 per cent, and by careful handling, even greater amounts may be added.

Thus the process of the invention yields a polymer which is soluble in a lubricating oil to produce a lubricant which has simultaneously a higher viscosity, a higher viscosity index, and superior extreme pressure properties than is possible with any prior combination of the substances; these properties being obtainable because of the unique capability of the polymer of breaking rings to accept the phosphorus pentasulfide without breaking the main chain of the polymer.

The polymer also is compatible with, or soluble in, a wide range of other substances to which it imparts valuable properties. It is soluble in asphalt, giving an increased strength and reduced penetration. It is soluble in waxes generally, both paraffin wax and the naturally occurring waxes, to increase the melting point and increase the viscosity of the molten wax. The treated polymer is compatible with, and soluble in, polybutene (Vistanex), in which it yields an increased stability and many other valuable and important properties. Other objects and details of the invention will be apparent from the following description.

It has been found readily possible to polymerize the various cyclopentadienes by a low temperature technique using a Friedel-Crafts type catalyst into polymers of almost unlimited molecular weights, depending upon the purity of the polymers, the lowness of the temperature and the potency of the catalyst.

The raw material for the polymerization may be any of the five carbon atom ring compounds of which series the first member is cyclopentadiene itself and the other members contain respectively one or more alkyl residues substituted into the five carbon atom ring. That is, cyclopentadiene has the following structural formula:

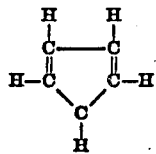

in which any hydrogen may be replaced by an alkyl residue of one or more carbon atoms up to about six or eight. All of the members of this homologous series of cyclopentadienes polymerize quite readily by the application thereto of the low temperature polymerization technique as disclosed in U. S. Patent No. 2,356,128.

In the polymerization procedure the desired cyclopentadiene is cooled to temperatures ranging from about 0° C. down to temperatures as low as —164° C., although the preferred temperature range lies between about 0° C. and about —140.

The cyclopentadiene may be cooled in any convenient way. The cooling may be obtained by a refrigerating jacket upon the mixing vessel or upon the reactor as desired, in which case any convenient refrigerant may be used including such substances as ammonia, liquid carbon dioxide, liquid sulfur dioxide, liquid propane, liquid ethane, liquid ethylene, or even liquid methane. Alternatively, the cooling may be obtained by direct admixture of the cyclopentadiene with an internal refrigerant. However, when the internal refrigerant is used the available substances are much more restricted in number, since they must be substances which do not inactivate the catalyst and do not interfere with the polymerization reaction. Of these substances the preferred ones are such substances as liquid propane, yielding a temperature of about —40° C., liquid or solid carbon dioxide, yielding a temperature of about —78° C., liquid ethane yielding a temperature of about —103° C., or liquid methane yielding a temperature of about —164° C. It should be noted that in each instance where these substances are used, they are used in an admixture which yields a raised, composite, boiling point which is usually several degrees to as much as 10° higher than the boiling point of the pure refrigerant, especially when the amount of refrigerant is relatively small in comparison to the bulk of cold liquid. If the internal refrigerant is used and used in substantial quantities, it may serve as both refrigerant and diluent.

In some instances it is desirable to add a diluent, which may consist of such substances as ethyl or methyl chloride or butane or pentane or hexane or heptane or light naphtha or ethylene dichloride or chloroform, or various of the fluorine substituted aliphatic compounds or the like. When a refrigerant jacket is used it is usually desirable to use a diluent with the cyclopentadiene, since the polymerization proceeds more smoothly and with less cross linkage; less gel formation and less insolubilization.

When the cyclopentadiene material has reached the desired low temperature it is polymerized by the use of a Friedel-Crafts type catalyst.

For the catalyst any active metal halide as outlined by N. O. Calloway in his article on "The Friedel-Crafts synthesis" printed in the issue of "Chemical Reviews" published for the American Chemical Society at Baltimore in 1935 in volume XVII, No. 3, the article beginning on p. 327, the list being particularly well shown on page 375, may be used. Of the catalysts listed by Calloway the preferred ones are aluminum chloride or the double halides of aluminum such as aluminum chlorobromide or aluminum alkyl halides or the like or titanium tetrachloride or boron trifluoride.

It is preferable that all of these catalysts be used in solution since they are more potent in solution and are more efficient in their polymerization action.

For the catalyst solvent, any low-freezing non-complex forming solvent may be used. It is essential that the catalyst solvent have a freezing point below 0° C., thereby being low freezing, although it is not necessary that the freezing point of the catalyst solvent be as low as the polymerization temperature. It is also necessary that the catalyst solvent boil away from the catalyst with no more than a nominal rise, one or two degrees in temperature over the boiling point of the pure solvent under the same pressure, thereby showing the absence of complex formation. Preferred solvents depend to a considerable extent upon the catalyst chosen. For aluminum chloride, such substances as ethyl or methyl chloride or carbon disulfide are preferred. With aluminum chloro bromide, the range is widened to include a considerable number of the hydrocarbon substances, those having from two to six or seven carbon atoms being preferred, such solvents as liquid ethane, liquid propane, liquid butane, and the like being satisfactorily usable. The same solvents are conveniently usable with boron trifluoride and with titanium tetrachloride. Gaseous boron trifluoride may be used directly, although the polymerization reaction does not proceed as rapidly nor as satisfactorily. Titanium tetrachloride, being a liquid down to −30° C., is also readily usable since it dissolves in the cyclopentadiene mixture readily at any temperature.

The catalyst may be applied to the cold cyclopentadiene mixture in any convenient manner such as by spraying the solution on to the surface of the cold, vigorously stirred olefinic material. Alternatively, the catalyst may be delivered in the form of a fine high-pressured jet into the body of the rapidly stirred cold olefinic material; or the catalyst and olefins may be mixed by means of concentric jets discharging into a space for free fall or into a suitable polymerizer; or by other means which are well known to those skilled in the art.

The reaction may be stopped short of completion or it may be carried to the complete polymerization of all of the cyclopentadiene in the reactor, depending to some extent upon the presence or absence of diluent or diluent refrigerant.

The solid polymer may be recovered in any desired way, a convenient and preferred method being to discharge the polymerized mixture into warm water which may if desired contain small quantities of alcohol to hasten the inactivation of the catalyst. However, the main purpose of the warm water is to vaporize out any residual diluent or refrigerant and any unpolymerized cyclopentadiene if desired, since the compound boils at approximately 42° C. (this, however, is not always possible with the higher members of the series since their boiling points are higher).

The poly cyclopentadiene is readily soluble in a wide range of hydrocarbon solvents including such substances as pentane, hexane, petroleum naphtha, gasoline, lubricating oil and the like. The polymer may show a Staudinger molecular weight (or Staudinger number) ranging from 1000 up to about 350,000, depending upon the lowness of the polymerization temperature, the purity of the polymerization mixture and the potency of the catalyst. For lubrication service the preferred molecular weight lies between about 10,000 and about 50,000, since molecular weights above about 50,000 do not withstand bearing pressures as well as desirable, and molecular weights below about 10,000 require an undue amount of polymer to give a satisfactory thickening effect.

It may be noted that the polymer has a molecular unsaturation of approximately 100% (except for such reduction in unsaturation as may be accounted for by cross linkage or gel formation) since there is a double bond remaining for every molecule of cyclopentadiene polymerized.

This polymer is the basic material for the next step in the reaction; which is a treatment of the polymer by phophorus pentasulfide. This treatment may be accomplished in a number of different ways. A convenient procedure is to dissolve the polymer in a solvent such as carbon tetrachloride, add to the solution an appropriate amount of phosphorus pentasulfide, and boil the solution under reflux conditions for a substantial length of time. The boiling point of carbon tetrachloride is low enough to avoid thermal breakdown of the polymer molecule, yet high enough to yield a reasonably rapid rate of reaction with phosphorus pentasulfide. It may be noted that 1 or 2% of phosphorus pentasulfide may be incorporated into the polymer in from 30 to 90 minutes heating and that larger amounts up to 15% or even higher may be incorporated into the polymer by prolonged heating and boiling up to times as great as 25 to 50 hours. When a sufficient amount of the phosphorus pentasulfide has been combined into the molecule, the solution may be filtered to remove any uncombined excess, whereafter the carbon tetrachloride may be boiled out to leave the solid, pentasulfide-treated, cyclopentadiene polymer which may contain from 1% to 10% or more of phosphorus pentasulfide in combined form.

An alternative method of preparation is to put the polycyclopentadiene onto the double roll mill, add the solid phosphorus pentasulfide and mill the mixture until a thoroughly homogeneous mixture is obtained. This treatment alone will insure combination of a small amount of phosphorus pentasulfide into the polymer. When larger amounts are to be combined, the polymer is preferably set aside and allowed to stand at an elevated temperature ranging from 75 to 125° C., for time intervals ranging from a few hours to several days.

Either of these methods yields a solid polymer which is conveniently available to be dissolved in a hydrocarbon lubricant, either oil or grease.

Alternatively, the polymer may be dissolved in a light petroleum hydrocarbon solvent or in a light spindle oil and the phosphorus pentasulfide added, the mixture being stirred and heated until a sufficient amount of the phosphorus pentasulfide is combined into the polymer molecule. This treatment may also combine some phosphorus pentasulfide into the lubricant molecules which may, in some instances, be desirable.

It is usually preferable that the phosphorus pentasulfide treated polymer be dissolved in a relatively very light spindle oil in order to obtain a concentrated product suitable for storage and shipment without obtaining a material which is so nearly solid as to be difficult to incorporate into a heavier bodied lubricant.

The polymer, either as such or in a light spindle oil solution, may then be incorporated into the desired lubricating oil to produce a thickened lubricant having a viscosity index ranging from 120 to 140 or higher, or may be blended into an appropriate grease compound which may be either lime or a soda grease, with the desired and customary addition agents. This procedure may yield lubricants of any desired viscosity, depending upon the particular polymer chosen and the amount added to the oil solution. In addition the oil shows very valuable extreme pressure properties as shown by tests on the Almen machine.

The resulting lubricant is extremely valuable for all kinds of heavy-duty service, especially engine lubricants with the newer types of bearings and transmission and differential gear boxes where hypoid gears are used.

Example 1

A polymer of cyclopentadiene was prepared as above described by diluting cyclopentadiene (having a purity of approximately 95%) with liquid propane, using about 3 volumes of liquid propane per volume of cyclopentadiene to produce a temperature of approximately −38 to −40° C. To this solution there was then added approximately one volume of a methyl chloride solution containing 1.2% of aluminum chloride. This amount of catalyst produced almost complete polymerization of the cyclopentadiene present (it may be noted that the amount of catalyst required ranges from a minimum of 0.1 volume to an almost unlimited maximum, 2 or 3 volumes being permissible where the complete polymerization is desired.) The polymerization proceeded rapidly and was complete within a minute or less, whereupon the entire reaction mixture was dumped into warm water to volatilize out the methyl chloride and residual propane and to hydrolyze as much as possible of the catalyst. The resulting polymer was then placed on the mill and milled in a current of warm water for 30 minutes to remove as much as possible of the residual catalyst. The polymer was then milled to dryness and approximately 5 parts by weight of phosphorus pentasulfide per 100 parts of polymer were added and thoroughly milled in, cutting the polymer back and forth across the face of the mill until a thoroughly homogeneous dispersion was obtained. Milling was then continued when a thoroughly homogeneous mixture was obtained, and the polymer was set aside at a temperature of approximately 100° C. for 18 hours. The polymer was then dissolved to the extent of approximately 20% in a light spindle oil and filtered to remove traces of uncombined pentasulfide. This solution was then added in the proportion of approximately 5 volumes per 100 volumes of a high grade lubricating oil (43 S. S. U. at 210° F. and V. I. of 112) to yield the following inspection record:

Saybolt Viscosity at 100° F_____ 347
Saybolt Viscosity at 210° F_____ 67
V. I._____ 140

Example 2

A poly-cyclopentadiene was prepared by mixing together 1,000 parts by volume of cyclopentadiene of high purity, and 3,000 parts by volume of a liquid refinery C₃ cut containing 86 per cent of propane and 14 per cent of propylene. This mixture resulted in a temperature of approximately −35° C. To the mixture there was then added 520 parts by volume of a solution of aluminum chloride in methyl chloride in the proportion of 0.88 g. of aluminum chloride per 100 c. c. of methyl chloride. The catalyst solution was added in the form of a fine spray onto the surface of the rapidly stirred olefin containing mixture over a period of a small number of minutes. The reaction proceeded promptly to yield a nearly complete polymerization of the cyclopentadiene. At the end of the reaction, the mixture was dumped into warm water to drive off the volatiles and inactivate the catalyst. The solid polymer was then strained out from the water slurry, placed on the mill and washed with water to remove as much as possible of the catalyst material. The polymer was then dried on the mill. The solid polymer was then dissolved in toluene in the proportion of 30 g. of polymer per liter of toluene. When the solution was complete, 5 per cent by weight (of the polymer) of phosphorus pentasulfide was added to the solution and the mixture was heated under reflux conditions for one hour. The solution was then cooled to room temperature, treated with clay, and filtered through paper. The toluene was then evaporated out from the solution to leave the desired dried phosphorus- and sulphur-containing polymer.

The polymer was found to have a Staudinger molecular weight number of 15,620, and to contain 1.6 per cent of combined sulphur and 0.8 per cent of combined phosphorus. The resulting polymer was then placed in a warm kneader (Baker-Perkins type), and approximately 50 parts (per part of polymer) of petroleum wax, having a melting point of 135° was slowly added, the temperature being sufficiently high to yield a molten blend, the addition of paraffin being started quite slowly, almost dropwise fashion. Samples of the original paraffin wax and of the wax containing the polymer were tested for tensile strength to yield the following inspection record:

| 132 E. N. P. Wax | 2% P₂S₅ treated polymer in 132 C. M. P. Wax |
|---|---|
| Tensile (# ¼ sq. in.)_____59 | Tensile (# ¼ sq. in.)_____66 |

These results show a substantial and worthwhile gain in tensile strength of the paraffin, and amounting to more than a 10 per cent increase which, in paraffin is very valuable.

Many uses for paraffin require that it be kept in molten condition for long periods of time, especially when it is being used as an impregnant for paper or other fabric, and prolonged heating tests on this material show that the paraffin is much more stable in the presence of the polymer than without it.

Example 3

A sample of polycyclopentadiene was prepared as above described, with a Staudinger molecular weight number of 14,600, and treated on the mill at about 80° C., with approximately 2 per cent phosphorus pentasulfide. After forming a homogeneous dispersion in the polymer, the mixture was set aside for 18 hours at a temperature of 130° C. for completion of the reaction. Analysis of the polymer showed that it contained approximately 0.9 per cent of combined sulfur, and 0.4 per cent of combined phosphorus. Amounts of polymer of 1 per cent, 3 per cent, and 6 per cent were then added to a high-grade lubricating oil, and the viscosity indexes were determined to yield the following inspection record:

|  | C. S. at 100° F. | C. S. at 110° F. | V. I. |
|---|---|---|---|
| 0% Polymer in the oil | 43.0 |  | 112 |
| 1% Polymer added to oil | 47.63 | 7.65 | 130.2 |
| 3% Polymer added to oil | 102.6 | 15.26 | 136.8 |
| 6% Polymer added to oil | 249.3 | 33.69 | 134.1 |

These results show the excellent improvement in viscosity and viscosity index obtainable by the addition of the treated polymer to a good lubricating oil. In addition, tests on the Almen machine and in service show the lubricant to have a very superior extreme pressure characteristic.

Example 4

A sample of pure methyl cyclopentadiene was similarly polymerized and treated as in Examples 1, 2 and 3, and was found to yield similar improvements in properties.

Example 5

A sample of polymerized, phosphorus pentasulfide treated cyclopentadiene was added to a soda grease in the proportion of approximately 5 per cent, the polymer being incorporated in the grease during the cooking operation. Upon test under shock loading conditions, this grease was found to have extreme pressure properties similar to those previously obtained.

Thus the invention produces a thickened lubricant having a high viscosity, a high viscosity index and high E. P. properties with a minimum amount of thickening agent obtained by the treatment of poly cyclopentadiene by phosphorus pentasulfide and the solution of the treated polymer in a lubricant.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

The invention claimed is:

1. A lubricant consisting essentially of a hydrocarbon substance containing dissolved therein 0.1 to 15% of a product obtained by the reaction of a phosphorus pentasulfide and a homo-polymer of a compound having the formula:

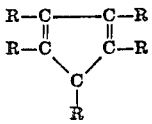

wherein R represents a substance selected from the class consisting of hydrogen and saturated aliphatic hydrocarbons containing from 1 to 8 carbon atoms, said reaction being maintained at a temperature of 75° to 130° C. for a time sufficient to effect the reaction whereby between 0.1% and 15% of phosphorus and sulfur is combined with said polymer.

2. A lubricant composition as in claim 1 wherein R is a hydrogen.

3. A lubricant composition as in claim 1 wherein the alpha R is a methyl group and the remaining R's are hydrogens.

4. A lubricant composition as in claim 1 wherein the alpha R is a propyl group and the remaining R's are hydrogens.

5. A lubricant consisting essentially of a soda base grease containing dissolved therein 0.1 to 15% of a product obtained by the reaction of a phosphorus pentasulfide and the homo-polymer of a compound having the formula

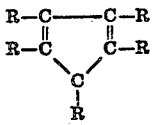

wherein R represents a substance selected from the class consisting of hydrogen and saturated aliphatic hydrocarbons containing from 1 to 8 carbon atoms, said reaction being maintained at a temperature of 75° to 130° C. for a time sufficient to effect a reaction whereby between 0.5% to 15% of phosphorus and sulfur is combined with said polymer.

6. A lubricant consisting essentially of a lime base grease containing dissolved therein 0.1 to 15% of a product obtained by the reaction of a phosphorus pentasulfide and the homo-polymer of a compound having the formula:

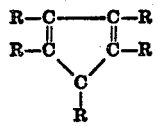

wherein R represents a substance selected from the class consisting of hydrogen and saturated aliphatic hydrocarbons containing from 1 to 8 carbon atoms, said reaction being maintained at a temperature of 75° to 130° C. for a time sufficient to effect a reaction whereby between 0.5% to 15% of phosphorus and sulfur is combined with said polymer.

7. A lubricant consisting essentially of a hydrocarbon lubricating oil containing dissolved therein 0.1 to 15% of a solid homo-polymer of a compound having the formula:

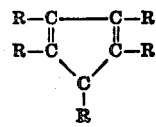

wherein R represents a substance selected from the class consisting of hydrogen and saturated aliphatic hydrocarbons containing from 1 to 8 carbon atoms, treated with phosphorus pentasulfide at a temperature within the range of 75° to 130° C. for a time sufficient to effect a reaction whereby between 0.5% to 15% of phosphorus and sulfur is combined with said polymer.

8. A lubricant consisting essentially of a hydrocarbon lubricating substance containing dissolved therein 0.1 to 15% of a reaction product of phosphorus pentasulfide with a solid linear homo-polymer of a compound having the formula:

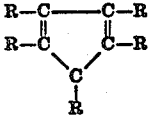

wherein R represents a compound selected from the class consisting of hydrogen and saturated aliphatic hydrocarbons containing from 1 to 8 carbon atoms, said homo-polymer having a molecular weight within the approximate range of 10,000–50,000 at a temperature of 75° to 130° C., said reaction product being characterized by having a molecular chain length substantially equal to the original compound, and a combined sulfur compound and a combined phosphorus compound in the range of 0.1% and 15%.

9. A lubricant consisting essentially of a waxy mineral lubricating oil having dissolved therein 0.1 to 15% of a reaction product formed by heating a mixture containing 100 parts of a homo-polymer of a compound having the formula:

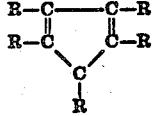

wherein said homo-polymer represents a substance selected from the class consisting of hydrogen, and saturated aliphatic hydrocarbons containing from 1 to 8 carbon atoms, R having a molecular weight within the approximate range of 10,000–50,000 and about 5 parts of phosphorus pentasulfide at a temperature within the range of 75° C. to 130° C. for a period of at least 30 minutes.

WILLIAM J. SPARKS.
DAVID W. YOUNG.

REFERENCES CITED

The following references are of record in the file of this patent:

UNITED STATES PATENTS

| Number | Name | Date |
|---|---|---|
| 2,142,980 | Huijser et al. | Jan. 3, 1939 |
| 2,316,082 | Loane | Apr. 6, 1943 |
| 2,316,088 | Loane | Apr. 6, 1943 |
| 2,316,089 | Anderson | Apr. 6, 1943 |
| Re. 22,464 | Kelso | Apr. 4, 1944 |

OTHER REFERENCES

Cyclo Pentadiene, A new Conjugated Diene from the Coal-Tar Industry, by Wilson Jr., Wells, India Rubber World, vol. 110, April 1944, page 63. (Copy in Division 50.)

Chemistry & Utilization of Cyclopentadiene, Chem. Reviews, vol. 34, February 1944, page 43. (Copy in Division 50.)